(12) United States Patent
Jogan et al.

(10) Patent No.: US 12,381,038 B2
(45) Date of Patent: Aug. 5, 2025

(54) FILM CAPACITOR

(71) Applicants: Murata Manufacturing Co., Ltd., Nagaokakyo (JP); Shizuki Electric Co., Inc., Nishinomiya-shi (JP)

(72) Inventors: Satoru Jogan, Nagaokakyo (JP); Ryo Majima, Nagaokakyo (JP); Kimiaki Kikuchi, Nishinomiya (JP)

(73) Assignees: MURATA MANUFACTURING CO., LTD., Nagaokakyo (JP); SHIZUKI ELECTRIC CO., INC., Nishinomiya (JP)

( * ) Notice: Subject to any disclaimer, the term of this patent is extended or adjusted under 35 U.S.C. 154(b) by 295 days.

(21) Appl. No.: 17/573,051

(22) Filed: Jan. 11, 2022

(65) Prior Publication Data

US 2022/0130611 A1  Apr. 28, 2022

Related U.S. Application Data

(63) Continuation of application No. PCT/JP2020/017741, filed on Apr. 24, 2020.

(30) Foreign Application Priority Data

Aug. 30, 2019  (JP) ................. 2019-158673

(51) Int. Cl.
*H01G 4/248* (2006.01)
*H01G 4/18* (2006.01)
*H01G 4/32* (2006.01)

(52) U.S. Cl.
CPC ............ *H01G 4/248* (2013.01); *H01G 4/18* (2013.01); *H01G 4/32* (2013.01)

(58) Field of Classification Search
CPC ........... H01G 4/248; H01G 4/18; H01G 4/32; H10G 4/32

(Continued)

(56) References Cited

U.S. PATENT DOCUMENTS 4,127,891 A * 11/1978 Rayburn ................. H01G 4/26
                                                            361/309
5,905,628 A *  5/1999 Okuno .................... H01G 4/32
                                                            29/25.42

(Continued)

FOREIGN PATENT DOCUMENTS

JP     2013004908 A  *  1/2013
JP     2013004916 A     1/2013

(Continued)

OTHER PUBLICATIONS

International Search Report issued for PCT/JP2020/017741, date of mailing Jul. 28, 2020.

(Continued)

*Primary Examiner* — Arun Ramaswamy
(74) *Attorney, Agent, or Firm* — ArentFox Schiff LLP

(57) ABSTRACT

A film capacitor that includes: a laminate including a first dielectric film, a second dielectric film, a first metal layer, and a second metal layer laminated in a laminate direction; a first external electrode on a first end surface of the laminate in a width direction perpendicular to the laminate direction and connected to the first metal layer; and a second external electrode on a second end surface of the laminate in the width direction, the first external electrode having first protrusions arranged in the laminate direction and protruding toward the second external electrode in the width direction, at least one of the first protrusions of the first external electrode having a first protrusion end with a width greater than a total thickness of the first dielectric film and the second dielectric film by two times or more.

19 Claims, 3 Drawing Sheets

(58) Field of Classification Search
USPC .................. 361/301.4, 301.5, 306.3, 321.3
See application file for complete search history.

(56) References Cited

U.S. PATENT DOCUMENTS

2003/0142461 A1* 7/2003 Decker .................. H01G 4/30
361/306.3
2013/0314839 A1* 11/2013 Terashima ............. H01G 4/33
361/301.4

FOREIGN PATENT DOCUMENTS

WO    WO-2018190437 A1 * 10/2018 ............... H01G 4/32
WO    WO-2019097753 A1 * 5/2019 ............. H01G 4/008

OTHER PUBLICATIONS

Written Opinion of the International Searching Authority issued for PCT/JP2020/017741, date of mailing Jul. 28, 2020.

* cited by examiner

FILM CAPACITOR

CROSS REFERENCE TO RELATED APPLICATIONS

The present application is a continuation of International application No. PCT/JP2020/017741, filed Apr. 24, 2020, which claims priority to Japanese Patent Application No. 2019-158673, filed Aug. 30, 2019, the entire contents of each of which are incorporated herein by reference.

FIELD OF THE INVENTION

The present invention relates to a film capacitor.

BACKGROUND OF THE INVENTION

One type of capacitor is known as a film capacitor and includes a flexible resin film as a dielectric, a first metal layer, and a second metal layer opposing the first metal layer across the resin film. Such a film capacitor is produced by, for example, winding or laminating a resin film on which the first metal layer is formed and a resin film on which the second metal layer is formed.

For example, Patent Literature 1 discloses a film capacitor including a wound metallized film and an electrode member connected to each end of the wound metallized film in a width direction, the wound metallized film including a stack of a first film member having a metal film on at least one surface thereof and a second film member. The first film member protrudes from the second film member in the width direction. The wound metallized film has first protrusion ends and first recess ends alternately arranged in a laminate direction. The metal film is exposed in portions where the first protrusion ends protrude from the first recess ends in the width direction.

Patent Literature 1: JP 2013-4916 A

SUMMARY OF THE INVENTION

Patent Literature 1 describes that the disclosed film capacitor can improve the mechanical strength of contact portions between the metallized film and the electrode members without processing the first film member. However, the film capacitor disclosed in Patent Literature 1 still has a room for improving the mechanical strength of the contact portions between the metallized film and the electrode members.

The present invention was made to solve the above issue and aims to provide a film capacitor having a high bonding strength between external electrodes and a laminate including dielectric films and metal layers.

In a first aspect, the film capacitor of the present invention includes: a laminate including a first dielectric film having a first main surface and a second main surface opposing each other; a second dielectric film having a third main surface and a fourth main surface opposing each other; a first metal layer on the first main surface of the first dielectric film; and a second metal layer on one of the second main surface of the first dielectric film and the third main surface of the second dielectric film, the first dielectric film, the second dielectric film, the first metal layer, and the second metal layer being laminated in a laminate direction; a first external electrode on a first end surface of the laminate in a width direction perpendicular to the laminate direction and connected to the first metal layer; and a second external electrode on a second end surface of the laminate in the width direction, the first external electrode having first protrusions arranged in the laminate direction and protruding toward the second external electrode in the width direction, at least one of the first protrusions of the first external electrode having a first protrusion end with a width greater than a total thickness of the first dielectric film and the second dielectric film by two times or more.

In a second aspect, the film capacitor of the present invention includes: a first dielectric film having a first main surface and a second main surface opposing each other; a second dielectric film having a third main surface and a fourth main surface opposing each other; a first metal layer on the first main surface of the first dielectric film; and a second metal layer on one of the second main surface of the first dielectric film and the third main surface of the second dielectric film, the first metal layer, the first dielectric film, the second metal layer, and the second dielectric film being sequentially laminated in a laminate direction to form a metallized film stack, the laminate including a plurality of metallized film stacks, a first end surface in a width direction perpendicular to the laminate direction, and a second end surface in the width direction, the first end surface of the laminate having two or more of the metallized film stacks sequentially arranged with end surfaces of the first dielectric films thereof aligned, and displaced from metallized film stacks adjacent thereto in the laminate direction toward the second external electrode in the width direction so as to define a recess; a first external electrode on the first end surface of the laminate and connected to the first metal layer, the first external electrode filling the recess of the laminate; and a second external electrode on the second end surface of the laminate.

The present invention can provide a film capacitor having a high bonding strength between external electrodes and a laminate including dielectric films and metal layers.

DETAILED DESCRIPTION OF THE PREFERRED EMBODIMENTS

The film capacitor of the present invention is described below. The present invention is not limited to the following preferred embodiments, and may be suitably modified without departing from the gist of the present invention. Combinations of preferred features described in the following preferred features are also within the scope of the present invention.

Film Capacitor

Hereinafter, an example of the film capacitor of the present invention is described, which is a wound film capacitor including dielectric films and metal layers that are wound in a laminate state. The film capacitor of the present invention may be a laminate film capacitor including dielectric films and metal layers that are alternately laminated.

Figure 1:
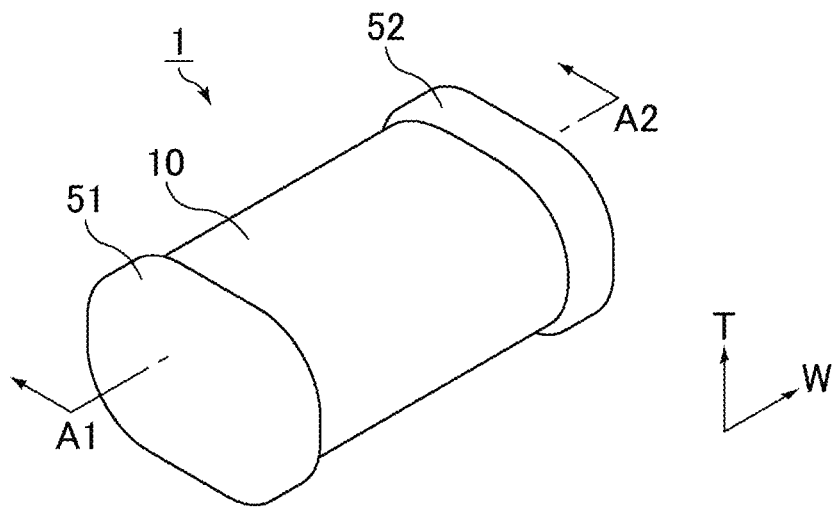
FIG. 1 is a schematic perspective view of an example of a film capacitor of the present invention.
Figure 2:
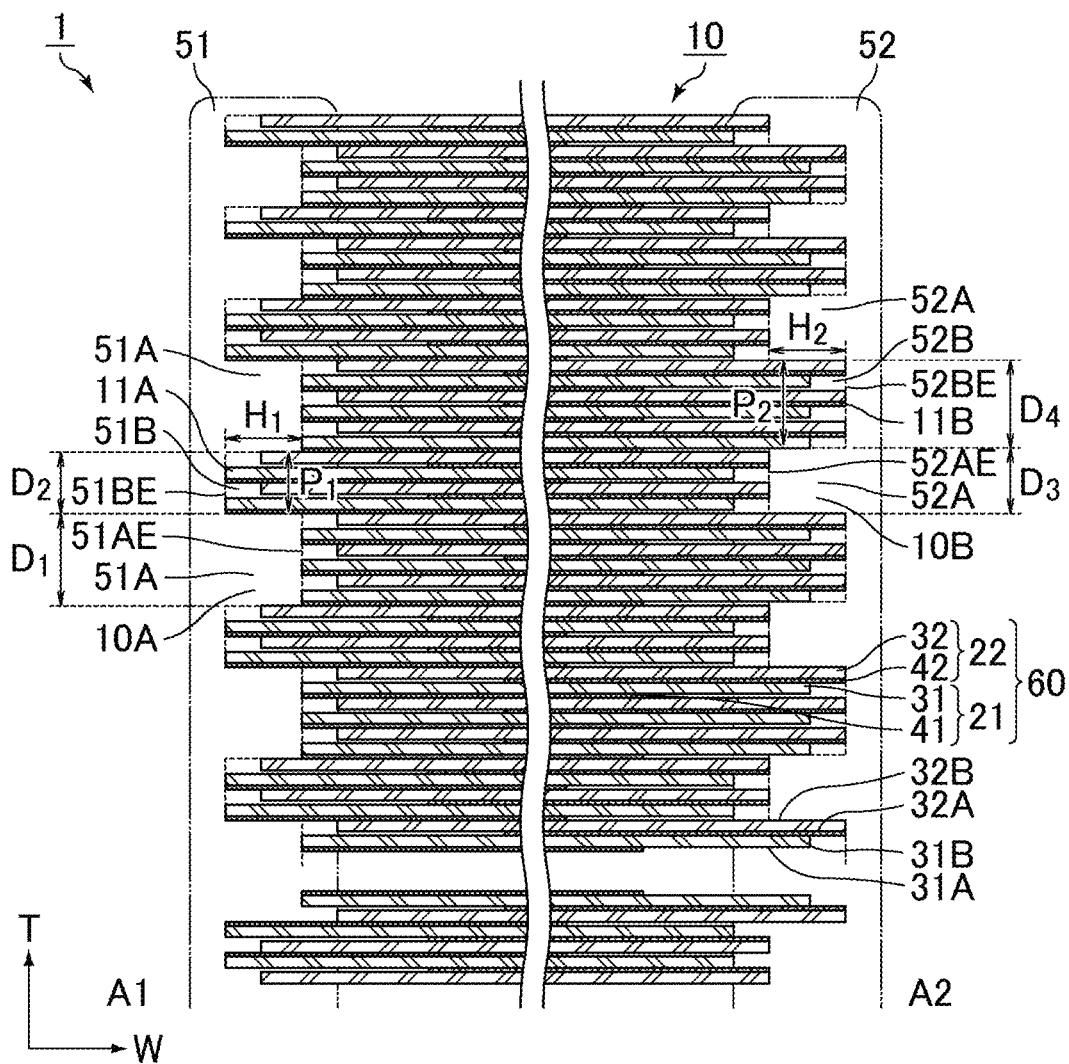
FIG. 2 is a schematic cross-sectional view taken along the line A1-A2 in FIG. 1.

FIG. 1 is a schematic perspective view of an example of a film capacitor of the present invention. FIG. 2 is a schematic cross-sectional view taken along the line A1-A2 in FIG. 1.

Herein, the laminate direction and the width direction of the film capacitor are respectively defined to be the direction shown by the arrow T and the direction shown by the arrow W shown in FIG. 1 and FIG. 2. Although a wound film capacitor can be considered to have multiple laminate directions, the laminate direction is herein defined to be the direction indicated by the arrow T. The laminate direction T and the width direction W are perpendicular to each other.

As shown in FIG. 1 and FIG. 2, a film capacitor 1 includes a laminate 10, a first external electrode 51 on a first end surface of the laminate 10 in the width direction W, and a second external electrode 52 on a second end surface of the laminate 10 in the width direction W.

As shown in FIG. 2, the laminate 10 is a wound body including a first metallized film 21 and a second metallized film 22 wound in a laminate state in a laminate direction T. The film capacitor 1 is a wound film capacitor including the laminate 10 that is a wound body. FIG. 2 mainly shows an upper half cross section of the film capacitor 1 shown in FIG. 1 in the laminate direction T. This figure is also applicable to a lower half cross section.

In order to reduce the height of the film capacitor 1, preferably, the laminate 10 is pressed into a flat shape having an oval or oblong cross-section so that the laminate 10 has a smaller thickness than in the case of having a perfectly circular cross-section.

The film capacitor 1 may include a cylindrical winding shaft. The winding shaft is arranged along the central axis of the first metallized film 21 and the second metallized film 22 in a wound state, and serves as a spool when the first metallized film 21 and the second metallized film 22 are wound.

The first metallized film 21 includes a first dielectric film 31 and a first metal layer 41 on a first main surface 31A of the first dielectric film 31.

The first metal layer 41 is disposed such that it extends to a first periphery of the first metallized film 21 but not to a second periphery of the first metallized film 21 in the width direction W.

The second metallized film 22 includes a second dielectric film 32 and a second metal layer 42 on a third main surface 32A of the second dielectric film 32.

The second metal layer 42 is disposed such that it extends not to a first periphery of the second metallized film 22 but to a second periphery of the second metallized film 22 in the width direction W.

In the laminate 10, adjacent first metallized film 21 and second metallized film 22 are displaced from each other in the width direction W such that a first end of the first metal layer 41 that extends to the first periphery of the first metallized film 21 is exposed from a first end surface of the laminate 10 and a second end of the second metal layer 42 that extend to the second periphery of the second metallized film 22 is exposed from a second end surface of the laminate 10.

The laminate 10, in which the first metallized film 21 and the second metallized film 22 are wound in a laminate state in the laminate direction T, can also be considered as a wound body in which the first metal layer 41, the first dielectric film 31, the second metal layer 42, and the second dielectric film 32 are sequentially wound in a laminate state in the laminate direction T.

In the laminate 10, the first metallized film 21 and the second metallized film 22 are wound in a laminate state in the laminate direction T such that the first main surface 31A of the first dielectric film 31 and the fourth main surface 32B of the second dielectric film 32 face each other and the second main surface 31B of the first dielectric film 31 and the third main surface 32A of the second dielectric film 32 face each other. Specifically, in the laminate 10, the first metallized film 21 and the second metallized film 22 are wound in a laminate state in the laminate direction T such that the first metallized film 21 comes inside the second metallized film 22, the first metal layer 41 comes inside the first dielectric film 31, and the second metal layer 42 comes inside the second dielectric film 32.

Alternatively, the second metal layer 42 may be disposed on the second main surface 31B of the first dielectric film 31, not on the third main surface 32A of the second dielectric film 32. In this case, the laminate 10 includes a metallized film in which the first metal layer 41 is disposed on the first main surface 31A of the first dielectric film 31 and the second metal layer 42 is disposed on the second main surface 31B of the first dielectric film 31, and the second dielectric film 32, which are wound in a laminate state in the laminate direction T.

The first metal layer 41, the first dielectric film 31, the second metal layer 42, and the second dielectric film 32 are sequentially laminated in the laminate direction T to form a metallized film stack 60. In other words, the first metallized film 21 and the second metallized film 22 are laminated in the laminate direction T to form the metallized film stack 60. In the laminate 10, multiple metallized film stacks 60 are laminated in the laminate direction T, and adjacent metallized film stacks 60 are displaced from each other in the width direction W in certain region(s).

Preferably, the first dielectric film 31 and the second dielectric film 32 each contain a curable resin as a main component thereof. The term "main component" as used herein refers to a component with the highest weight percentage, and preferably refers to a component whose weight percentage is more than 50 wt %.

The curable resin may be a thermosetting resin or a photocurable resin. The term "thermosetting resin" refers to a heat-curable resin, and the curing method is not limited. Thus, the thermosetting resin encompasses a resin cured by a method other than heating (such as applying light or electron beam) as long as the resin is heat curable. Some materials may start a reaction due to their own reactivity. The thermosetting resin also includes such materials that do not necessarily require external heat, light, or the like to start curing. The same applies to the photocurable resins, and the curing method is not limited as long as the resin is light curable.

The curable resin may contain at least one of a urethane bond or a urea bond or none of a urethane bond and a urea bond. The presence of a urethane bond and/or a urea bond can be confirmed using a Fourier transform infrared (FT-IR) spectrophotometer.

Preferably, the curable resin is made of a cured product of a first organic material and a second organic material. Examples of such a cured product include a cured product obtained by a reaction between a hydroxy group (OH group) of the first organic material and an isocyanate group (NCO group) of the second organic material. When a cured product is obtained by such a reaction, the dielectric films may contain uncured residues of the starting materials. For example, the first dielectric film 31 and the second dielectric film 32 may each contain at least one of a hydroxy group or an isocyanate group. In this case, the first dielectric film 31 and the second dielectric film 32 may each contain either one or both of a hydroxy group and an isocyanate group. The presence of a hydroxy group and/or an isocyanate group can be confirmed using a Fourier transform infrared (FT-IR) spectrophotometer.

Preferably, the first organic material is a polyol having two or more hydroxy groups in the molecule. Examples of the polyol include polyvinyl acetals such as polyvinyl acetoacetal, polyether polyols such as a phenoxy resin, and polyester polyols. The first organic material may be any combination of two or more organic materials.

The second organic material is preferably an isocyanate compound, an epoxy resin, or a melamine resin, each having two or more functional groups in the molecule. The second organic material may be any combination of two or more organic materials.

Examples of the isocyanate compound include aromatic polyisocyanates such as diphenylmethane diisocyanate (MDI) and tolylene diisocyanate (TDI); and aliphatic polyisocyanates such as hexamethylene diisocyanate (HDI). Examples of the isocyanate compound may also include modified products of these polyisocyanates, such as a modified product containing carbodiimide or urethane.

Any epoxy resin may be used as long as it is a resin having an epoxy ring. Examples thereof include bisphenol A epoxy resins, epoxy resins having a biphenyl skeleton, epoxy resins having a cyclopentadiene skeleton, and epoxy resins with a naphthalene skeleton.

Any melamine resin may be used as long as it is an organic nitrogen compound having a triazine ring at the center of the structure and three amino groups around the triazine ring. Examples thereof include alkylated melamine resin. Examples of the melamine resin may also include modified products of melamine.

Preferably, the first dielectric film 31 and the second dielectric film 32 are produced by molding a resin solution containing the first organic material and the second organic material into films and curing the films by heat treatment.

The first dielectric film 31 and the second dielectric film 32 may each contain a vapor-deposited polymer film as a main component thereof. The vapor-deposited polymer film may contain at least one of a urethane bond or a urea bond or none of a urethane bond and a urea bond. The term "vapor-deposited polymer film" refers to a film formed by vapor deposition polymerization. In principle, the curable resin includes such a film.

The first dielectric film 31 and the second dielectric film 32 may each contain a thermoplastic resin as a main component. Examples of the thermoplastic resin include polypropylene, polyethersulfone, polyetherimide, and polyarylate.

For example, the first dielectric film 31 and the second dielectric film 32 may each contain, as other components in addition to the main component, a silicone resin and uncured residues of the starting materials such as the first organic material and the second organic material.

The first dielectric film 31 and the second dielectric film 32 may each contain additives that provide various functions. Examples of the additives include a leveling agent for providing smoothness. A preferred additive is one having a functional group that reacts with a hydroxy group and/or an isocyanate group, which forms part of the crosslinked structure of the cured product. Examples of such an additive include a resin having at least one functional group selected from the group consisting of hydroxy groups, epoxy groups, silanol groups, and carboxy groups.

The first dielectric film 31 and the second dielectric film 32 may have different compositions, but preferably have the same composition.

Preferably, the first dielectric film 31 and the second dielectric film 32 each have a thickness of 0.5 μm to 5 μm. The first dielectric film 31 and the second dielectric film 32 may have different thicknesses, but preferably have the same thickness.

The thicknesses of the first dielectric film 31 and the second dielectric film 32 can be measured with an optical film thickness gauge.

The first metal layer 41 and the second metal layer 42 may each contain as a constituting material a metal such as aluminum, zinc, titanium, magnesium, tin, or nickel, for example.

The first metal layer 41 and the second metal layer 42 may have different compositions, but preferably have the same composition.

Preferably, the first metal layer 41 and the second metal layer 42 each have a thickness of 5 nm to 40 nm.

The thickness of the first metal layer 41 can be determined by observing a cross section of the first metallized film 21 in the thickness direction using a transmission electron microscope (TEM). The thickness of the second metal layer 42 can be determined in the same manner.

The first external electrode 51 is disposed on the first end surface of the laminate 10 and is in contact with the exposed end of the first metal layer 41, and is thereby connected to the first metal layer 41.

In order to achieve sufficient connectivity between the first metal layer 41 and the first external electrode 51, on the first end surface of the laminate 10, the first metallized film 21 preferably protrudes from the second metallized film 22 in the width direction W. Specifically, on the first end surface of the laminate 10, the first dielectric film 31 preferably protrudes from the second dielectric film 32 in the width direction W.

The second external electrode 52 is disposed on the second end surface of the laminate 10 and is in contact with the exposed end of the second metal layer 42, and is thereby connected to the second metal layer 42.

In order to achieve sufficient connectivity between the second metal layer 42 and the second external electrode 52, on the second end surface of the laminate 10, the second metallized film 22 preferably protrudes from the first metallized film 21 in the width direction W. Specifically, on the second end surface of the laminate 10, the second dielectric film 32 preferably protrudes from the first dielectric film 31 in the width direction W.

The first external electrode 51 and the second external electrode 52 may each contain as a constituting material a metal such as zinc, aluminum, tin, or a zinc-aluminum alloy, for example. Preferably, the first external electrode 51 and the second external electrode 52 are formed by thermally spraying such a metal onto the first and second end surfaces of the laminate 10.

The first external electrode 51 and the second external electrode 52 may have different compositions, but preferably have the same composition.

The laminate 10 may have a structure different from the structure as shown in FIG. 2. For example, the first metallized film 21 may include the first metal layer 41 having two metal layer portions that are separated in the width direction W and are disposed such that a first metal layer portion extends to the first periphery of the first metallized film 21 and a second metal layer portion extends to the second periphery of the first metallized film 21. In this case, a capacitor can be formed between the first metal layer 41 and the second metal layer 42 when the first metal layer portion of the first metal layer 41 is connected to the first external electrode 51 and the second metal layer portion thereof is connected to the second external electrode 52 and the second metal layer 42 is not connected to any of the first external electrode 51 and the second external electrode 52.

The first external electrode 51 has protrusions 51A arranged in the laminate direction T. The protrusions 51A of the first external electrode 51 protrude toward the second external electrode 52 in the width direction W. Here, the first end surface of the laminate 10 is provided with recesses 10A each of which is defined by a structure in which the metallized film stacks 60 are displaced toward the second external electrode 52 in the width direction W. The first external electrode 51 fills the recesses 10A of the laminate 10. Specifically, the protrusions 51A of the first external electrode 51 are designed to fill the recesses 10A of the laminate 10.

At least one of the protrusions 51A has a protrusion end 51AE with a width $D_1$ (length in the laminate direction T) greater than the total thickness of the first dielectric film 31 and the second dielectric film 32 by two times or more. With the protrusion end 51AE of at least one protrusion 51A having a width $D_1$ within the above range, a contact area is increased between the laminate 10 and the first external electrode 51, leading to a better bonding strength between the laminate 10 and the first external electrode 51. The width $D_1$ of the protrusion end 51AE of at least one protrusion 51A is preferably three times or more the total thickness of the first dielectric film 31 and the second dielectric film 32. Also, the width $D_1$ of the protrusion end 51AE of at least one protrusion 51A is preferably greater than the total thickness of the first dielectric film 31 and the second dielectric film 32 by 50 times or less.

The protrusion end 51AE of each protrusion 51A aligns with the end surface of the recess 10A on the closest side to the second external electrode 52 in the width direction W. The end surface of the recess 10A is also the first external electrode 51 side end surfaces of the metallized film stacks 60 that are displaced to a position closest to the second external electrode 52 in the width direction W so as to define the recess 10A.

The end surface of the metallized film stack 60 means the end surface of the most protruding member in the width direction W, among from the first metal layer 41, the first dielectric film 31, the second metal layer 42, and the second dielectric film 32. In the laminate 10 as shown in FIG. 2, the end surface of a metallized film stack 60 on the side of the first external electrode 51 corresponds to a position to which the end surface of the first dielectric film 31 (first metal layer 41) extends.

The protrusion end 51AE of each protrusion 51A (end surface of each recess 10A) preferably has a flat surface or may have an irregular surface having a level difference of 10 μm or less.

On the first end surface of the laminate 10 as shown in FIG. 2, two or more of the metallized film stacks 60 sequentially arranged with their end surfaces aligned, in this case, with the end surfaces of the first dielectric films 31 aligned, are displaced from the metallized film stacks 60 adjacent thereto in the laminate direction T toward the second external electrode 52 in the width direction W. Accordingly, the first end surface of the laminate 10 is provided with the recesses 10A each of which is defined by the structure in which two or more continuous metallized film stacks 60 are displaced in the described manner. Therefore, the protrusion end 51AE of at least one protrusion 51A (end surface of at least one recess 10A) has a width $D_1$ greater than the total thickness of the first dielectric film 31 and the second dielectric film 32 by two times or more.

The protrusions 51A of the first external electrode 51 include at least one protrusion having a protrusion end 51AE with a width $D_1$ greater than the total thickness of the first dielectric film 31 and the second dielectric film 32 by two times or more, and thus may include a protrusion having a protrusion end 51AE with a width $D_1$ greater than the total thickness of the first dielectric film 31 and the second dielectric film 32 by less than two times. Preferably, every protrusion 51A of the first external electrode 51 has the protrusion end 51AE with a width $D_1$ greater than the total thickness of the first dielectric film 31 and the second dielectric film 32 by two times or more. In this case, the widths $D_1$ of the protrusion ends 51AE of the protrusions 51A may be the same as or different from each other.

In order to achieve a sufficient bonding strength between the laminate 10 and the first external electrode 51, at least one protrusion 51A has the protrusion end 51AE with a width $D_1$ of preferably 30 μm to 500 μm.

In order to achieve a sufficient bonding strength between the laminate 10 and the first external electrode 51, at least one protrusion 51A has a height $H_1$ of preferably 30 μm to 700 μm.

In order to achieve a sufficient bonding strength between the laminate 10 and the first external electrode 51, the protrusions 51A are arranged with a pitch $P_1$ of preferably 30 μm to 300 μm in a central portion of the first external electrode 51 in the laminate direction T. Preferably, the pitch $P_1$ between the protrusions 51A is greater than the total thickness of the first dielectric film 31 and the second dielectric film 32 by two times or more. Preferably, the pitch $P_1$ between the protrusions 51A is greater than the total thickness of the first dielectric film 31 and the second dielectric film 32 by 30 times or less. The pitch $P_1$ between the protrusions 51A means the shortest distance between adjacent protrusions 51A in the laminate direction T.

Preferably, as shown in FIG. 2, the protrusions 51A are arranged with a smaller pitch $P_1$ at an end of the first external electrode 51 in the laminate direction T than in a central portion thereof in the laminate direction T. This structure can increase the bonding strength at an end of the first external electrode 51 in the laminate direction T, where the bonding strength with the laminate 10 tends to be low and peeling from the laminate 10 tends to occur.

The first external electrode 51 may have recesses 51B between the protrusions 51A. Each recess 51B depresses toward the side remote from the second external electrode 52 in the width direction W. Here, the first end surface of the laminate 10 is provided with the protrusions 11A each of which is defined by the structure in which at least one of the metallized film stacks 60 are displaced toward the first external electrode 51 in the width direction W. The recesses 51B of the first external electrode 51 are provided so as to avoid the protrusions 11A of the laminate 10.

Preferably, at least one of the recesses 51B has a recess end 51BE with a width $D_2$ (length in the laminate direction T) greater than the total thickness of the first dielectric film 31 and the second dielectric film 32 by two times or more. With the recess end 51BE of at least one recess 51B having a width $D_2$ within the above range, a contact area is further increased between the laminate 10 and the first external electrode 51, leading to a much better bonding strength between the laminate 10 and the first external electrode 51. More preferably, the width $D_2$ of the recess end 51BE of at least one recess 51B is greater than the total thickness of the first dielectric film 31 and the second dielectric film 32 by three times or more. Also, the width $D_2$ of the recess end 51BE of at least one recess 51B is preferably greater than the total thickness of the first dielectric film 31 and the second dielectric film 32 by 30 times or less.

The recess end 51BE of each recess 51B aligns with the end surface of the protrusion 11A on the closest side to the first external electrode 51 in the width direction W. The end surface of the protrusion 11A is also the first external electrode 51 side end surfaces of the metallized film stacks 60 that are displaced to a position closest to the first external electrode 51 in the width direction W so as to define the protrusion 11A.

The recess end 51BE of each recess 51B (end surface of each protrusion 11A) preferably has a flat surface or may have an irregular surface having a level difference of 10 μm or less.

The width $D_1$ of the protrusion end 51AE of each protrusion 51A, the height $H_1$ of each protrusion 51A, each pitch $P_1$ between the protrusions 51A, and the width $D_2$ of the recess end 51BE of each recess 51B can be measured by preparing a cross section shown in FIG. 2 using a device such as a rotational sander and performing measurements with a microscope having a length measurement function.

As shown in FIG. 2, the second external electrode 52 may have protrusions 52A arranged in the laminate direction T. The protrusions 52A protrude toward the first external electrode 51 in the width direction W. Here, the second end surface of the laminate 10 is provided with recesses 10B each of which is defined by a structure in which at least one of the metallized film stacks 60 are displaced toward the first external electrode 51 in the width direction W. The second external electrode 52 fills the recesses 10B of the laminate 10. Specifically, the protrusions 52A of the second external electrode 52 are designed to fill the recesses 10B of the laminate 10.

Preferably, at least one of the protrusions 52A has a protrusion end 52AE with a width $D_3$ (length in the laminate direction T) greater than the total thickness of the first dielectric film 31 and the second dielectric film 32 by two times or more. With the protrusion end 52AE of at least one protrusion 52A having a width $D_3$ within the above range, a contact area is increased between the laminate 10 and the second external electrode 52, leading to a better bonding strength between the laminate 10 and the second external electrode 52. The width $D_3$ of the protrusion end 52AE of at least one protrusion 52A is more preferably greater than the total thickness of the first dielectric film 31 and the second dielectric film 32 by three times or more. Also, the width $D_3$ of the protrusion end 52AE of at least one protrusion 52 is preferably greater than the total thickness of the first dielectric film 31 and the second dielectric film 32 by 50 times or less.

The protrusion end 52AE of a protrusion 52A aligns with the end surface of the recess 10B on the closest side to the first external electrode 51 in the width direction W. The end surface of the recess 10B is also the second external electrode 52 side end surfaces of the metallized film stacks 60 that are displaced to a position closest to the first external electrode 51 in the width direction W so as to define the recess 10B.

In the laminate 10 as shown in FIG. 2, the end surface of a metallized film stack 60 on the side of second external electrode 52 corresponds to a position to which the end surface of the second dielectric film 32 (second metal layer 42) extends.

The protrusion end 52AE of each protrusion 52A (end surface of each recess 10B) preferably has a flat surface or may have an irregular surface having a level difference of 10 μm or less.

On the second end surface of the laminate 10 as shown in FIG. 2, two or more of the metallized film stacks 60 sequentially arranged with their end surfaces aligned, in this case, with the end surfaces of the second dielectric films 32 aligned, are displaced from the metallized film stacks 60 adjacent thereto in the laminate direction T toward the first external electrode 51 in the width direction W. Accordingly, the second end surface of the laminate 10 is provided with the recesses 10B each of which is defined by the structure in which two or more continuous metallized film stacks 60 are displaced in the described manner. Therefore, the protrusion end 52AE of at least one protrusion 52A (end surface of at least one recess 10B) has a width $D_3$ greater than the total thickness of the first dielectric film 31 and the second dielectric film 32 by two times or more.

The protrusions 52A of the second external electrode 52 preferably include at least one protrusion having a protrusion end 52AE with a width $D_3$ greater than the total thickness of the first dielectric film 31 and the second dielectric film 32 by two times or more, and may include a protrusion having a protrusion end 52AE with a width $D_3$ greater than the total thickness of the first dielectric film 31 and the second dielectric film 32 by less than two times. More preferably, every protrusion 52A of the second external electrode 52 has the protrusion end 52AE with a width $D_3$ greater than the total thickness of the first dielectric film 31 and the second dielectric film 32 by two times or more. In this case, the widths $D_3$ of the protrusion ends 52AE of the protrusions 52A may be the same as or different from each other.

In order to achieve a sufficient bonding strength between the laminate 10 and the second external electrode 52, at least one protrusion 52A has the protrusion end 52AE with a width $D_3$ of preferably 30 μm to 500 μm.

In order to achieve a sufficient bonding strength between the laminate 10 and the second external electrode 52, at least one protrusion 52A has a height $H_2$ of preferably 30 μm to 700 μm.

In order to achieve a sufficient bonding strength between the laminate 10 and the second external electrode 52, the protrusions 52A are arranged with a pitch $P_2$ of preferably 30 μm to 300 μm in a central portion of the second external electrode 52 in the laminate direction T. Preferably, the pitch $P_2$ between the protrusions 52A is greater than the total thickness of the first dielectric film 31 and the second dielectric film 32 by two times or more. Preferably, the pitch $P_2$ between the protrusions 52A is greater than the total thickness of the first dielectric film 31 and the second dielectric film 32 by 30 times or less. The pitch $P_2$ between the protrusions 52A means the shortest distance between adjacent protrusions 52A in the laminate direction T.

Preferably, as shown in FIG. 2, the protrusions 52A are arranged with a smaller pitch $P_2$ at an end of the second external electrode 52 in the laminate direction T than in a central portion thereof in the laminate direction T. This structure can increase the bonding strength at an end of the second external electrode 52 in the laminate direction T, where the bonding strength with the laminate 10 tends to be low and peeling from the laminate 10 tends to occur.

The second external electrode 52 may have recesses 52B between the protrusions 52A. Each recess 52B depresses toward the side remote from the first external electrode 51 in the width direction W. Here, the second end surface of the laminate 10 is provided with the protrusions 11B each of which is defined by the structure in which at least one of the metallized film stacks 60 are displaced toward the second external electrode 52 in the width direction W. The recesses 52B of the second external electrode 52 are provided so as to avoid the protrusions 11B of the laminate 10.

Preferably, at least one of the recesses 52B has a recess end 52BE with a width $D_4$ (length in the laminate direction T) greater than the total thickness of the first dielectric film 31 and the second dielectric film 32 by two times or more. With the recess end 52BE of at least one recess 52B having a width $D_4$ within the above range, a contact area is further increased between the laminate 10 and the second external electrode 52, leading to a much better bonding strength between the laminate 10 and the second external electrode 52. More preferably, the width $D_4$ of the recess end 52BE of at least one recess 52B is greater than the total thickness of the first dielectric film 31 and the second dielectric film 32 by three times or more. Also, the width $D_4$ of the recess end 52BE of at least one recess 52B is preferably greater than the total thickness of the first dielectric film 31 and the second dielectric film 32 by 30 times or less.

The recess end 52BE of each recess 52B aligns with the end surface of the protrusion 11B on the closest side to the second external electrode 52 in the width direction W. The end surface of the protrusion 11B is also the second external electrode 52 side end surfaces of the metallized film stacks 60 that are displaced to a position closest to the second external electrode 52 in the width direction W so as to define the protrusion 11B.

The recess end 52BE of each recess 52B (end surface of each protrusion 11B) preferably has a flat surface or may have an irregular surface having a level difference of 10 μm or less.

The width $D_3$ of the protrusion end 52AE of each protrusion 52A, the height $H_2$ of each protrusion 52A, each pitch $P_2$ between the protrusions 52A, and the width $D_4$ of the recess end 52BE of each recess 52B can be measured by preparing a cross section shown in FIG. 2 using a device such as a rotational sander and performing measurements with a microscope having a length measurement function.

Method of Producing Film Capacitor

The film capacitor of the present invention is produced by the following method, for example.

<Metallized Film Formation Step>

Figure 3:
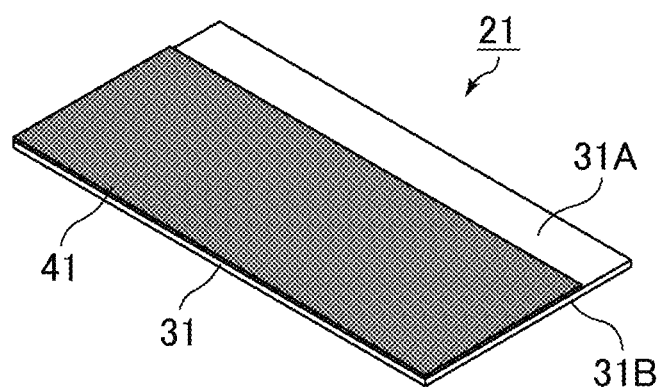
FIG. 3 is a schematic perspective view showing an example of a step in formation of a first metallized film.
Figure 4:
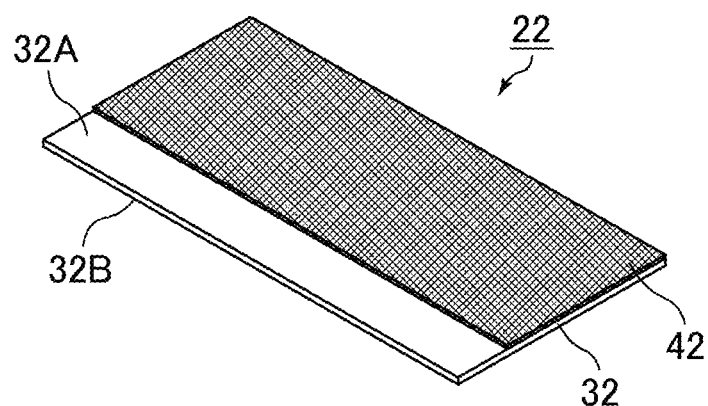
FIG. 4 is a schematic perspective view showing an example of a step in formation of a second metallized film.

FIG. 3 is a schematic perspective view showing an example of a step in formation of a first metallized film. FIG. 4 is a schematic perspective view showing an example of a step in formation of a second metallized film.

First, components such as the first organic material, the second organic material, and additives are mixed to prepare a resin solution, for example. The resulting resin solution is formed into films, and the films are then subjected to a heat treatment to be cured, whereby the first dielectric film 31 and the second dielectric film 32 are produced.

Then, as shown in FIG. 3, a metal such as aluminum, zinc, titanium, magnesium, tin, or nickel is vapor deposited onto the first main surface 31A of the first dielectric film 31 to form the first metal layer 41, whereby the first metallized film 21 is formed. Here, the first metal layer 41 is formed such that it extends to a first periphery of the first metallized film 21 but not to a second periphery of the first metallized film 21 in the width direction.

Also, as shown in FIG. 4, a metal such as aluminum, zinc, titanium, magnesium, tin, or nickel is vapor deposited onto the third main surface 32A of the second dielectric film 32 to form the second metal layer 42, whereby the second metallized film 22 is formed. Here, the second metal layer 42 is formed such that it extends not to a first periphery of the second metallized film 22 but to a second periphery of the second metallized film 22 in the width direction.

Alternatively, the second metal layer 42 may be formed on the second main surface 31B of the first dielectric film 31, not on the third main surface 32A of the second dielectric film 32. In this case, in this step, a metallized film that includes the first metal layer 41 on the first main surface 31A of the first dielectric film 31 and the second metal layer 42 on the second main surface 31B of the first dielectric film 31 is formed. Here, in the width direction, the first metal layer 41 may be formed such that it extends to a first periphery of the metallized film but not to a second periphery of the metallized film, and the second metal layer 42 may be formed such that it extends not to the first periphery of the metallized film but to the second periphery of the metallized film.

<Laminate Formation Step>

Figure 5:
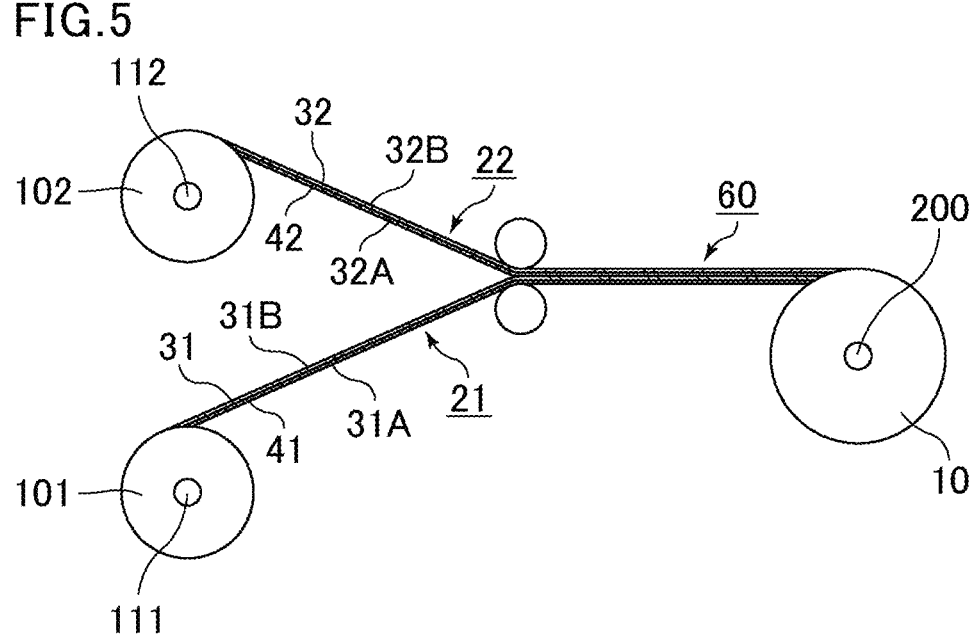
FIG. 5 is a schematic cross-sectional view showing an example of a step in formation of a laminate.

FIG. 5 is a schematic cross-sectional view showing an example of a step in formation of a laminate.

First, as shown in FIG. 5, prepared are a first film reel 101 in which the first metallized film 21 is wound around a first reel shaft 111 and a second film reel 102 in which the second metallized film 22 is wound around a second reel shaft 112. Then, the first metallized film 21 is unwound from the first film reel 101, and the second metallized film 22 is unwound from the second film reel 102. Here, the first metallized film 21 and the second metallized film 22 are unwound such that the second main surface 31B of the first dielectric film 31 and the third main surface 32A of the second dielectric film 32 face each other.

Subsequently, the unwound first metallized film 21 and second metallized film 22 are overlapped with each other with a certain displacement in the width direction into the metallized film stack 60, which is then wound up on a spool 200.

Figure 6:
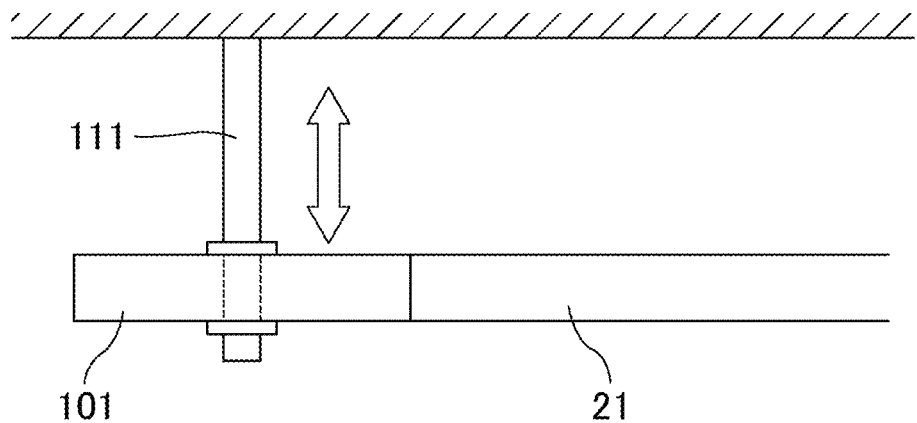
FIG. 6 is a schematic top view showing that the first metallized film is unwound from a first film reel shown in FIG. 5.

In unwinding the first metallized film 21, the first reel shaft 111 is oscillated in the width directions perpendicular to the unwinding direction. FIG. 6 is a schematic top view showing that the first metallized film is unwound from the first film reel shown in FIG. 5. As shown in FIG. 6, oscillating the first reel shaft 111 in the width directions (the directions indicated by the double-headed arrow) perpendicular to the unwinding direction allows the first metallized film 21 to be unwound on the same periodical move in the width directions.

Similarly, in unwinding the second metallized film 22, the second reel shaft 112 is oscillated in the width directions perpendicular to the unwinding direction, whereby the second metallized film 22 is unwound on the same periodical move in the width directions.

The first reel shaft 111 and the second reel shaft 112 (hereinafter, each of them is also simply referred to as a reel shaft when distinguishing between the two is not needed) are set to have the same oscillation conditions such as oscillation timing, oscillation period, and oscillation amplitude. Thereby, the laminate 10 as shown in FIG. 2, in which adjacent metallized film stacks 60 are displaced from each other in the width direction in certain region(s), is produced in a wound state around the spool 200.

Changing the above mentioned oscillation conditions for the reel shafts can adjust the specifications of the recesses 10A on the first end surface of the laminate 10 as shown in FIG. 2, such as the width of the recess end of each recess 10A, the depth of each recess 10A, each pitch between the recesses 10A, and the width of the protrusion end of each protrusion 11A. As a result, the specifications of the first external electrode 51 to be formed on the later-described step, such as the width $D_1$ of the protrusion end 51AE of each protrusion 51A, the height $H_1$ of each protrusion 51A, each pitch $P_1$ between the protrusions 51A, and the width $D_2$ of the recess end 51BE of each recess 51B, can be adjusted.

In addition, the winding speed of the spool 200 may be changed along with the oscillation conditions of the reel shafts, which can adjust the specifications of the recesses 10A and the protrusions 11A of the laminate 10, i.e., the specifications of the protrusions 51A and the recesses 51B of the first external electrode 51. For example, in a condition with a certain oscillation period of the reel shafts and a certain winding speed of the spool 200, a greater oscillation amplitude of the reel shafts gives greater recesses 10A on the first end surface of the laminate 10, i.e., a taller height $H_1$ of the protrusions 51A of the first external electrode 51.

Also, in a condition with a certain oscillation period of the reel shafts and a certain oscillation amplitude of the reel shafts, a slower winding speed of the spool 200 gives a smaller pitch between the recesses 10A on the first end surface of the laminate 10, i.e., a smaller pitch $P_1$ between the protrusions 51A of the first external electrode 51. Thus, in forming one laminate 10, slowing down the winding speed of the spool 200 at starting and ending of winding reduces the pitch between the recesses 10A at an end on the first end surface of the laminate 10 in the laminate direction T as compared with the pitch in the central portion thereof in the laminate direction T, as shown in FIG. 2. In other words, as shown in FIG. 2, the pitch $P_1$ between the protrusions 51A of the first external electrode 51 becomes smaller at an end of the first external electrode 51 in the laminate direction T than in the central portion thereof in the laminate direction T.

Similar adjustment is applicable to the specifications of the protrusions 52A and the recesses 52B of the second external electrode 52, which are formed in the later-described step.

The resulting laminate 10 may be pressed from the directions perpendicular to the width direction to be formed into an oval cylinder according to need.

<External Electrode Formation Step>

A metal such as zinc, aluminum, tin, or a zinc-aluminum alloy is thermally sprayed onto the first end surface of the laminate 10, whereby the first external electrode 51 as shown in FIG. 2 is formed so as to be connected to the first metal layer 41.

As shown in FIG. 2, the first external electrode 51 has protrusions 51A arranged in the laminate direction T. The protrusions 51A protrude toward the second external electrode 52 in the width direction W. The width $D_1$ of the protrusion end 51AE of at least one protrusion 51A is greater than the total thickness of the first dielectric film 31 and the second dielectric film 32 by two times or more.

Similarly, a metal such as zinc, aluminum, tin, or a zinc-aluminum alloy is thermally sprayed onto the second end surface of the laminate 10, whereby the second external electrode 52 as shown in FIG. 2 is formed so as to be connected to the second metal layer 42.

As shown in FIG. 2, the second external electrode 52 may have the protrusions 52A arranged in the laminate direction T. The protrusions 52A protrude toward the first external electrode 51 in the width direction W. Preferably, the protrusion end 52AE of at least one protrusion 52A has a width $D_3$ greater than the total thickness of the first dielectric film 31 and the second dielectric film 32 by two times or more.

Through these steps, the film capacitor 1 as shown in FIG. 2 is produced.

EXAMPLES

Examples that more specifically disclose the film capacitor of the present invention are described below. The present invention is not limited to these examples.

Example 1

A film capacitor of Example 1 was produced by the following method.

<Metallized Film Formation Step>

First, a phenoxy resin, which was a bisphenol A epoxy resin as the first organic material, and diphenyl methane diisocyanate, which was as the second organic material, were mixed at a weight ratio of 7:3 to prepare a resin solution. The resulting resin solution was formed into films, and the films were subjected to a heat treatment to be cured, whereby a first dielectric film and a second dielectric film were produced. The first dielectric film and the second dielectric film each had a thickness of 3 μm.

Then, aluminum was vapor deposited onto a first main surface of the first dielectric film to form a first metal layer, whereby a first metallized film was formed. Here, the first metal layer was formed such that it extended to a first periphery of the first metallized film but not to a second periphery of the first metallized film in the width direction. The first metal layer had a thickness of 20 nm.

Also, aluminum was vapor deposited onto a third main surface of the second dielectric film to form a second metal layer, whereby a second metallized film was formed. Here, the second metal layer was formed such that it extended not to a first periphery of the second metallized film but to a second periphery of the second metallized film in the width direction. The second metal layer had a thickness of 20 nm.

<Laminate Formation Step>

First, prepared were a first film reel in which the first metallized film was wound around a first reel shaft and a second film reel in which the second metallized film was wound around a second reel shaft. Then, the first metallized film was unwound from the first film reel, and the second metallized film was unwound from the second film reel. Here, the first metallized film and the second metallized film were unwound such that a second main surface of the first dielectric film and the third main surface of the second dielectric film faced each other.

Subsequently, the unwound first metallized film and second metallized film were overlapped with each other with a certain displacement in the width direction to form a metallized film stack, which was then wound up on a spool. The winding speed of the spool was 1 m/sec.

Here, in unwinding the first metallized film, the first reel shaft was oscillated in the width directions that were perpendicular to the unwinding direction. Similarly, in unwinding the second metallized film, the second reel shaft was oscillated in the width directions that were perpendicular to the unwinding direction. The first reel shaft and the second reel shaft were set to have the same oscillation timing, an oscillation period of 1 second, and an oscillation amplitude of 0.2 mm. As a result, a laminate, in which adjacent metallized film stacks were displaced from each other in the width direction in certain regions, was produced in a wound state around the spool. The resulting laminate was then pressed from the directions perpendicular the width direction to be formed into an oval cylinder.

<External Electrode Formation Step>

A zinc-aluminum alloy was thermally sprayed onto a first end surface of the laminate, whereby a first external electrode was formed so as to be connected to the first metal layer.

The first external electrode had protrusions arranged in the laminate direction. These protrusions protruded toward a second external electrode formed later in the width direction. The protrusion end of at least one protrusion had a width of 200 μm, which was greater than the total thickness of the first dielectric film and the second dielectric film by two times or more.

Similarly, a zinc-aluminum alloy was thermally sprayed onto a second end surface of the laminate, whereby the second external electrode was formed so as to be connected to the second metal layer.

The second external electrode had protrusions arranged in the laminate direction. These protrusions protruded toward the first external electrode in the width direction. The protrusion end of at least one protrusion had a width of 200 μm, which was greater than the total thickness of the first dielectric film and the second dielectric film by two times or more.

Through these steps, the film capacitor of Example 1 was produced.

Example 2

A film capacitor of Example 2 was produced as in the film capacitor of Example 1, except that the oscillation amplitude of the reel shaft was changed to 0.7 mm in the laminate formation step. The protrusion end of at least one protrusion of the first external electrode had a width of 200 μm. The protrusion end of at least one protrusion of the second external electrode had a width of 200 μm.

Example 3

A film capacitor of Example 3 was produced as in the film capacitor of Example 1, except that the winding speed of the spool was changed to 6 m/sec in the laminate formation step. The protrusion end of at least one protrusion of the first external electrode had a width of 500 μm. The protrusion end of at least one protrusion of the second external electrode had a width of 500 μm.

Example 4

A film capacitor of Example 4 was produced as in the film capacitor of Example 1, except that the winding speed of the spool was changed to 6 m/sec and the oscillation amplitude of the reel shafts was changed to 0.5 mm in the laminate formation step. The protrusion end of at least one protrusion of the first external electrode had a width of 500 μm. The protrusion end of at least one protrusion of the second external electrode had a width of 500 μm.

Example 5

A film capacitor of Example 5 was produced as in the film capacitor of Example 1, except that the winding speed of the spool was changed to 6 m/sec and the oscillation amplitude of the reel shafts was changed to 0.7 mm in the laminate formation step. The protrusion end of at least one protrusion of the first external electrode had a width of 500 μm. The protrusion end of at least one protrusion of the second external electrode had a width of 500 μm.

Comparative Example 1

A film capacitor of Comparative Example 1 was produced as in the film capacitor of Example 1, except that the winding speed of the spool was changed to 6 m/sec and the reel shafts were not oscillated (oscillation amplitude: 0 mm) in the laminate formation step. The first external electrode and the second external electrode had no protrusions.

Evaluation

Figure 7:
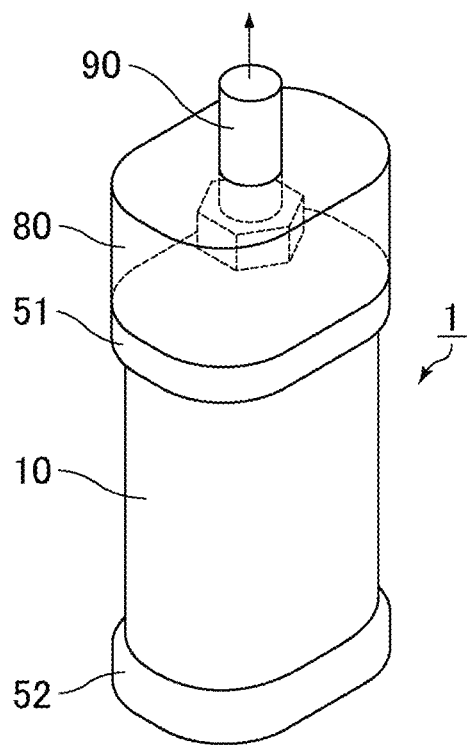
FIG. 7 is a schematic perspective view showing a method for measuring the bonding strength between a laminate and a first external electrode.

In each of the film capacitors of Examples 1 to 5 and Comparative Example 1, the bonding strength between the laminate and the first external electrode was measured. FIG. 7 is a schematic perspective view showing a method for measuring the bonding strength between the laminate and the first external electrode. As shown in FIG. 7, the film capacitor 1 includes the laminate 10, the first external electrode 51 on the first end surface of the laminate 10, and the second external electrode 52 on the second end surface of the laminate 10.

First, an epoxy resin layer 80 was bonded to cover the entire top surface (surface remote from the laminate 10) of the first external electrode 51 of the film capacitor 1. In the epoxy resin layer 80 was embedded a bolt 90 for fixing the film capacitor to the force gauge of a tensile tester. Subsequently, while the bolt 90 was fixed to the force gauge of the tensile tester and the laminate 10 was thereby fixed, a tensile load was applied in a direction (direction indicated by an arrow in FIG. 7) vertical to the bonded surface between the laminate 10 and the first external electrode 51. The bonding strength per unit area (unit: MPa) was calculated according to L/M, wherein L represents a tensile load L when the first external electrode 51 was peeled off the laminate 10 and M represents an area M of the bonded surface between the laminate 10 and the first external electrode 51. The results are shown in Table 1.

TABLE 1

| | Laminate forming step | | |
|---|---|---|---|
| | Winding speed of spool (m/sec) | Oscillation amplitude of reel shafts (mm) | Bonding strength (MPa) |
| Example 1 | 1 | 0.2 | 9.5 |
| Example 2 | 1 | 0.7 | 9.1 |
| Example 3 | 6 | 0.2 | 9.9 |
| Example 4 | 6 | 0.5 | 9.9 |
| Example 5 | 6 | 0.7 | 10.6 |
| Comparative Example 1 | 6 | 0 | 8.0 |

As shown in Table 1, the film capacitors of Examples 1 to 5 each had a better bonding strength between the laminate and the first external electrode than the film capacitor of Comparative Example 1.

REFERENCE SIGNS LIST 1 film capacitor
10 laminate
10A, 10B recess of laminate
11A, 11B protrusion of laminate
21 first metallized film
22 second metallized film
31 first dielectric film
31A first main surface
31B second main surface
32 second dielectric film
32A third main surface
32B fourth main surface
41 first metal layer
42 second metal layer
51 first external electrode
51A protrusion of first external electrode
51AE protrusion end of protrusion of first external electrode
51B recess of first external electrode
51BE recess end of recess of first external electrode
52 second external electrode
52A protrusion of second external electrode
52AE protrusion end of protrusion of second external electrode
52B recess of second external electrode
52BE recess end of recess of second external electrode
60 metallized film stack
80 epoxy resin layer
90 bolt
101 first film reel
102 second film reel
111 first reel shaft
112 second reel shaft
200 spool
$H_1$ height of protrusion of first external electrode
$H_2$ height of protrusion of second external electrode
$P_1$ pitch between protrusions of first external electrode
$P_2$ pitch between protrusions of second external electrode
T laminate direction
W width direction
$D_1$ width of protrusion end of protrusion of first external electrode
$D_2$ width of recess end of recess of first external electrode
$D_3$ width of protrusion end of protrusion of second external electrode
$D_4$ width of recess end of recess of second external electrode

The invention claimed is:

1. A film capacitor comprising:
a laminate including:
   a first dielectric film having a first main surface and a second main surface opposing each other;
   a second dielectric film having a third main surface and a fourth main surface opposing each other;
   a first metal layer on the first main surface of the first dielectric film; and
   a second metal layer on one of the second main surface of the first dielectric film and the third main surface of the second dielectric film,
   the first dielectric film, the second dielectric film, the first metal layer, and the second metal layer being laminated in a laminate direction;
a first external electrode on a first end surface of the laminate in a width direction perpendicular to the laminate direction and connected to the first metal layer; and
a second external electrode on a second end surface of the laminate in the width direction,
the first external electrode having first protrusions arranged in the laminate direction and protruding toward the second external electrode in the width direction,
at least one of the first protrusions of the first external electrode having a first protrusion end with a length in the laminate direction greater than a total thickness of the first dielectric film and the second dielectric film by two times or more, and
a surface of the first protrusion end of the at least one of the first protrusions of the first external electrode has a level difference of 10 μm or less.

2. The film capacitor according to claim 1, wherein the length in the laminate direction of the first protrusion end of the at least one of the first protrusions of the first external electrode is 30 μm to 500 μm.

3. The film capacitor according to claim 1, wherein a height of the at least one of the first protrusions of the first external electrode is 30 μm to 700 μm.

4. The film capacitor according to claim 1, wherein the first protrusions of the first external electrode are arranged with a pitch of 30 μm to 300 μm in a central portion of the first external electrode in the laminate direction.

5. The film capacitor according to claim 1, wherein the first protrusions of the first external electrode are arranged with a smaller pitch at an end of the first external electrode in the laminate direction than in a central portion thereof in the laminate direction.

6. The film capacitor according to claim 1, wherein the first external electrode has, between the first protrusions, a recess having a recess end with a length in the laminate direction greater than the total thickness of the first dielectric film and the second dielectric film by two times or more.

7. The film capacitor according to claim 1, wherein the first dielectric film protrudes from the second dielectric film in the width direction on the first end surface of the laminate.

8. The film capacitor according to claim 1,
wherein the first metal layer, the first dielectric film, the second metal layer, and the second dielectric film are sequentially laminated in the laminate direction to form a metallized film stack,
the laminate includes a plurality of metallized film stacks, and
on the first end surface of the laminate, two or more of the metallized film stacks are sequentially arranged with end surfaces of the first dielectric films thereof aligned, and the two or more of the metallized film stacks are displaced from metallized film stacks adjacent thereto in the laminate direction toward the second external electrode in the width direction.

9. The film capacitor according to claim 1, wherein the length in the laminate direction of the first protrusion end of the at least one of the first protrusions of the first external electrode is greater than the total thickness of the first dielectric film and the second dielectric film by two times to 50 times.

10. The film capacitor according to claim 1, wherein the second external electrode has second protrusions arranged in the laminate direction and protruding toward the first external electrode in the width direction, at least one of the second protrusions of the second external electrode have a second protrusion end with a length in the laminate direction greater than the total thickness of the first dielectric film and the second dielectric film by two times or more.

11. The film capacitor according to claim 10, wherein the length in the laminate direction of the second protrusion end of the at least one of the second protrusions of the second external electrode is greater than the total thickness of the first dielectric film and the second dielectric film by two times to 50 times.

12. The film capacitor according to claim 10, wherein a surface of the second protrusion end of the at least one of the second protrusions of the second external electrode has a level difference of 10 μm or less.

13. The film capacitor according to claim 10, wherein the length in the laminate direction of the second protrusion end of the at least one of the second protrusions of the second external electrode is 30 μm to 500 μm.

14. The film capacitor according to claim 10, wherein a height of the at least one of the second protrusions of the second external electrode is 30 μm to 700 μm.

15. The film capacitor according to claim 10, wherein the second protrusions of the second external electrode are arranged with a pitch of 30 μm to 300 μm in a central portion of the second external electrode in the laminate direction.

16. The film capacitor according to claim 10, wherein the second protrusions of the second external electrode are arranged with a smaller pitch at an end of the second external electrode in the laminate direction than in a central portion thereof in the laminate direction.

17. The film capacitor according to claim 10, wherein the second external electrode has, between the second protrusions, a recess having a recess end with a length in the laminate direction greater than the total thickness of the first dielectric film and the second dielectric film by two times or more.

18. A film capacitor comprising:
a laminate including:
    a first dielectric film having a first main surface and a second main surface opposing each other;
    a second dielectric film having a third main surface and a fourth main surface opposing each other;
    a first metal layer on the first main surface of the first dielectric film; and
    a second metal layer on one of the second main surface of the first dielectric film and the third main surface of the second dielectric film,
    the first metal layer, the first dielectric film, the second metal layer, and the second dielectric film being sequentially laminated in a laminate direction to form a metallized film stack,
    the laminate including a plurality of metallized film stacks, a first end surface in a width direction perpendicular to the laminate direction, and a second end surface in the width direction,
    the first end surface of the laminate having two or more of the metallized film stacks sequentially arranged adjacent to each other such that end surfaces of the first dielectric films thereof are aligned with each other, and displaced from metallized film stacks adjacent to the two or more of the metallized film stacks in the laminate direction toward the second external electrode in the width direction so as to define a recess;
a first external electrode on the first end surface of the laminate and connected to the first metal layer, the first external electrode filling the recess of the laminate; and
a second external electrode on the second end surface of the laminate.

19. A film capacitor comprising:
a laminate including:
    a first dielectric film having a first main surface and a second main surface opposing each other;
    a second dielectric film having a third main surface and a fourth main surface opposing each other;
    a first metal layer on the first main surface of the first dielectric film; and
    a second metal layer on one of the second main surface of the first dielectric film and the third main surface of the second dielectric film,
    the first dielectric film, the second dielectric film, the first metal layer, and the second metal layer being laminated in a laminate direction;
a first external electrode on a first end surface of the laminate in a width direction perpendicular to the laminate direction and connected to the first metal layer; and
a second external electrode on a second end surface of the laminate in the width direction,
the first external electrode having first protrusions arranged in the laminate direction and protruding toward the second external electrode in the width direction,
at least one of the first protrusions of the first external electrode having a first protrusion end with a length in the laminate direction greater than a total thickness of the first dielectric film and the second dielectric film by two times or more,
the second external electrode having second protrusions arranged in the laminate direction and protruding toward the first external electrode in the width direction,
at least one of the second protrusions of the second external electrode having a second protrusion end with a length in the laminate direction greater than the total thickness of the first dielectric film and the second dielectric film by two times or more, and
a surface of the second protrusion end of the at least one of the second protrusions of the second external electrode having a level difference of 10 μm or less.

* * * * *